United States Patent
Kotchey

[19]

[11] Patent Number: 5,870,398
[45] Date of Patent: Feb. 9, 1999

[54] INTRODUCING INTER-PACKET GAPS IN NETWORK TRANSMISSIONS

[75] Inventor: Christopher Michael Kotchey, Apalachin, N.Y.

[73] Assignee: International Business Machines Corporation, Armonk, N.Y.

[21] Appl. No.: 700,259

[22] Filed: Aug. 20, 1996

[51] Int. Cl.⁶ .................................................. H04J 3/14
[52] U.S. Cl. .......................................... 370/445; 370/413
[58] Field of Search ................................... 370/445, 448, 370/413, 414

[56] References Cited

U.S. PATENT DOCUMENTS 4,641,307  2/1987  Russell .................................... 370/445
5,418,784  5/1995  Ramakrishnan et al. ............... 370/445
5,526,355  6/1996  Yang et al. .............................. 370/448
5,568,469  10/1996 Sherer et al. ........................... 370/448

*Primary Examiner*—Chi H. Pham
*Assistant Examiner*—W. Todd Baker
*Attorney, Agent, or Firm*—Shelley M Beckstrand

[57] ABSTRACT

An InterPacket Gap (IPG) timer software object is given data packets, aka datagrams, from a system for transmission over a network medium. The IPG timer interfaces with a system-supplied timing mechanism for introducing an IPG between transmitted datagrams. Datagrams given to the IPG timer are enqueued for delivery, and, through the use of the system-supplied timer mechanism, delivered in the same order in which they were received to the network medium with a minimum time interval between the transmission of one datagram and the end of the transmission of the previous datagram.

5 Claims, 2 Drawing Sheets

INTRODUCING INTER-PACKET GAPS IN NETWORK TRANSMISSIONS

BACKGROUND OF THE INVENTION

1. Technical Field of the Invention

This invention relates to communication networks, and more specifically to the transmission of data packets over communication links requiring interpacket intervals.

2. Background Art

Network data traffic is composed of many pieces of information that are delivered from one sending computer or other such device to one or many other similar devices. Over many types of networks, the available bandwidth must be shared between many different senders and receivers. For both hardware- and software-related reasons, many networks require that an InterPacket Gap be introduced between the subsequent data packets that are delivered over a data network. The InterPacket Gap (IPG) is a minimum amount of time that must transpire between the transmission of one data packet and the beginning of the transmission of a subsequent data packet by the same sender. This invention describes a software method whereby a minimum IPG is introduced and guaranteed between subsequent data transmissions over a data network medium.

On most data networks, the data that is transmitted from sender to receiver is broken down into units called PACKETS, or DATAGRAMS. For the purpose of this invention, the terms are synonymous. Each packet requires some amount of time to transmit, depending on such factors as the size of the packet and the data transmission rate. The amount of time between the end of one transmission and the beginning of the next is known as the INTERPACKET GAP. FIG. 1 illustrates the concept. On CSMA/CD (Carrier Sense Multiple Access with Collision Detection) and other such network types, senders "listen" to the network to find periods of time during which the network is "idle" and available for transmitting data. Such networks impose a minimum InterPacket Gap on sending stations to allow other sending stations to recognize if and when they are able to transmit. In software, some networking protocols impose InterPacket Gap requirements also. In the IPX (Internetwork Packet exchange) protocol's RIP (Routing Information Protocol) component, for example, a minimum Interpacket Gap is required to allow receiving stations enough time to process the data they have received before they receive the next piece of data. With such requirements, a method is needed to introduce InterPacket Gaps in network transmissions while ensuring that it is at least as long as some minimum acceptable time period.

One method of introducing such gaps between packets is to record the time of the completion of the last packet sent. When a subsequent packet is to be sent, the current time is compared to the recorded time from the previous packet. If the amount of time that has transpired since the past packet is greater than the minimum gap allowable, the next packet is delivered and the process repeats. If the minimum amount of time has not transpired, the packet is stored and the time is checked again in the future.

It is an object of the invention to provide a system and method for introducing interpacket gaps in a manner transparent to the sending system application.

It is a further object of the invention to provide a system and method for encapsulating all of the system timer interfaces and datagram buffering data structures within a software object, such that a system needing the introduction of an IPG between network transmissions can do so transparently.

It is a further object to provide a system and method that allows an user system to make function calls as needed to deliver datagrams to a network without being aware of the mechanism making it possible.

It is still a further object of the invention to provide an intergap timer object wherein changes to the system timer interface, or storage data structure, may be made without the need for the calling system to be changed in any way.

SUMMARY OF THE INVENTION

This invention provides a system and method for transmitting datagrams to a network with at least a minimum interpacket gap. Inbound datagrams are received into a FIFO queue and, responsive to the absence or expiration of an interpacket gap interval timer, transmitted from that queue as outbound datagrams. The interpacket gap is set responsive to transmitting an outbound datagram and must expire before a next outbound datagram may be transmitted.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
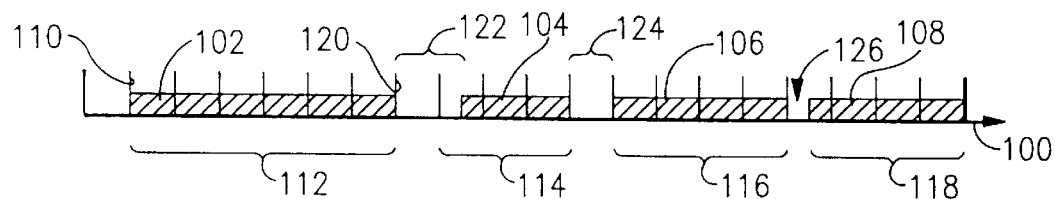
FIG. 1 is a schematic representation of data packets and interpacket gaps.

Referring to FIG. 1, which is a schematic representation of data packets and interpacket gaps, a plurality of packets 102, 104, 106, 108 are illustrated, having packet transmission times 112, 114, 116 and 118, and separated by interpacket gaps 122, 124, and 126, respectively. Delivery of packet 102, for example, begins at time 110 on time line 100, and ends at time 120.

Figure 2:
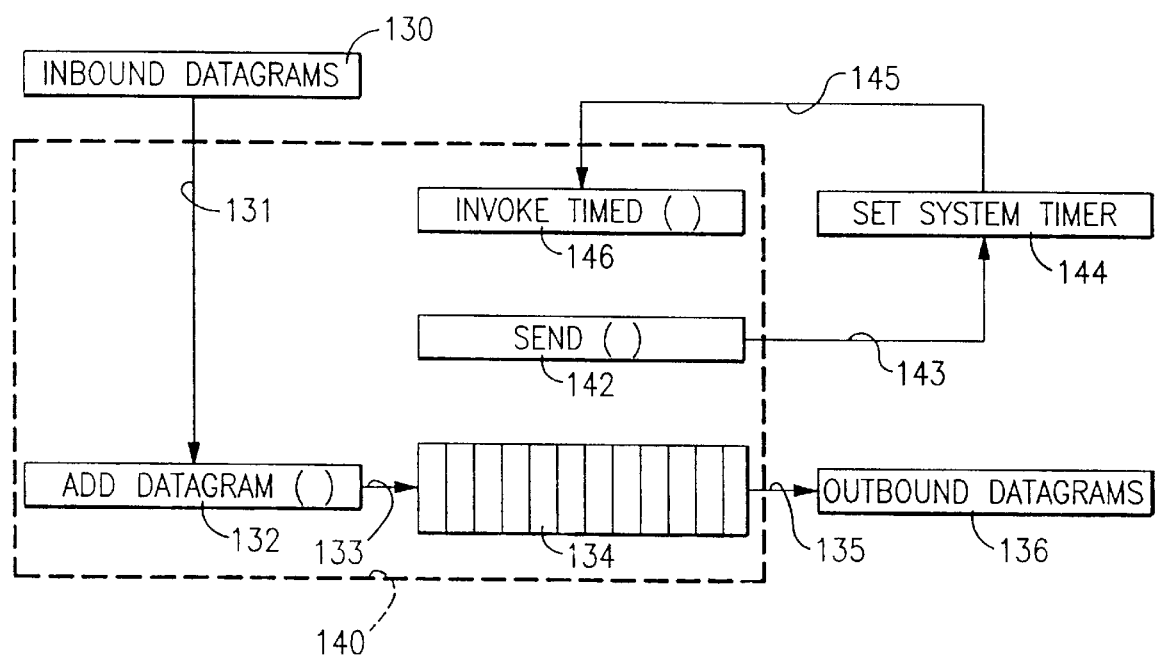
FIG. 2 is a diagrammatic representation of the interpacket gap timer object of the invention.

Referring to FIG. 2, in accordance with a preferred embodiment of the invention, interpacket gap (IPG) timer object 140 is provided for introducing interpacket gaps into stream of outbound datagrams 136 generated from a stream of inbound datagrams 130. Inbound datagrams 130 from the system application (not shown) are fed, as is represented by lines 131 and 133, to FIFO queue 134 responsive to execution of addDatagram( ) module 132. Datagrams are removed from FIFO queue 134 and fed, as is represented by line 135, as outbound datagrams 136, together with interpacket gaps, responsive to execution of sendo module 142. Send( ) module 142, as is represented by line 143, also sets system timer 144. As is represented by line 145, the system invokes callback upon expiration of timer 144, which results in execution of invokeTimed( ) 146, the sole function of which is to call send( ) 142.

In operation, IPG timer 140 is given data packets 130 from the system sending data and is solely responsible for transmitting these packets 130 as outbound datagrams 136 over the network medium, interfacing with the system-supplied timer mechanism, and introducing the interpacket gaps between outbound datagrams 136.

Datagrams 130 given to IPG timer 140 are enqueued for delivery, and, through the use of the system-supplied timer mechanism, the enqueued datagrams are delivered in the same order in which they were received as outbound datagrams 136 to the network medium with a minimum time interval between the transmission of one datagram and the end of the transmission of the previous datagram.

Data packets are given to IPG timer 140 by processes within the system that wish to transmit data, without the need for the calling system to know through what mechanism the IPGs are being introduced, or even to know if IPGs are being introduced at all. Changes to the storage mechanism (i.e. queue 134) and/or changes in the system timer interface 143 are encapsulated and hidden from the calling environment which need not know what mechanism or what interface is used by IPG timer 132.

Thus this preferred embodiment of intergap timer object 140 comprises the following elements:

A mechanism 134 for storing packets and retrieving them in the same order in which they were stored (e.g. a FIFO queue).

A programming module invokeTimed( ) 146 for starting execution of IPG timer 140 through the use of a system-supplied timer.

A programming module addDatagram( ) 132 for giving packets to IPG timer 140 by the system making use of timer 140.

A programming module send( ) 142 for delivering the next available data packet to the network.

Figure 3:
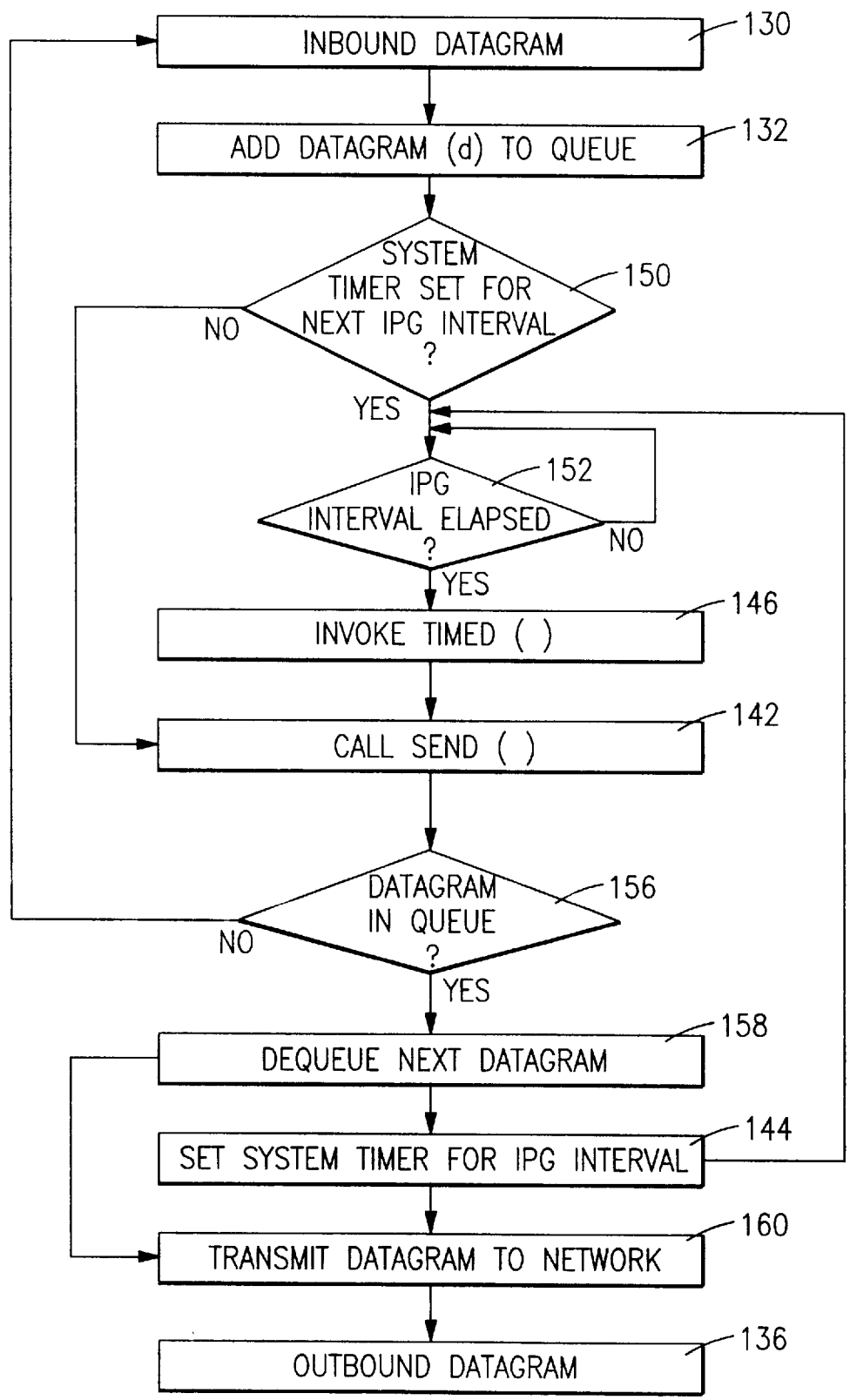
FIG. 3 is flow chart illustrating a preferred embodiment of the method of the invention.

Referring to FIG. 3, a preferred embodiment of the method of the invention is as follows. The using system calls addDatagram (d) 132 to add inbound datagram 130 to the FIFO queue. In step 150, IPG timer object 140 determines if a time interval previously set by system timer 144 as lapsed. If SO, send( ) is called at step 142. If not, in block 152 IPG timer object 140 waits for the IPG interval to lapse. Upon IPG interval lapsing, or expiring, invokeTimed( ) is called in block 146, the function of which is to call send( ) 142. If, as is determined in decision block 156, a datagram is not present in queue 134, IPG timer object 140 waits for the next inbound datagram 130. If in step 156 it is determined that a datagram is present in queue 134, the oldest datagram is dequeued in step 158 and in step 160 transmitted as outbound datagram 136 to the network medium. Also, in step 144, the system timer is set for an IPG interval, and IPG timer object 140 waits at step 152 for that interval to lapse.

By way of further operation of the preferred embodiment of the invention, consider the following pseudo-code representation of the operation of IPG timer object 140:

```
invokeTimed( ):
    call send( )
addDatagram( d ):
    add datagram d to the queue;
    if (system timer is not already set for next IPG
        interval)
        call send( );
    endif;
send( ):
    if (1 or more datagrams are waiting in the queue
        for processing)
        dequeue the next datagram d from the queue;
        transmit datagram d over the network medium;
        set system timer for next IPG interval;
    endif;
```

The member function invokeTimed( ) 146 is a callback function that is called from the system timer support process (es) after a specified interval of time has passed. Its single job is to call sendo member function 142.

The system process using the IPG Timer is only given direct access to the addDatagram( ) 132 member function. This member function 132 adds the inbound datagram 130 to the queue 134 of outgoing datagrams for processing, then checks to see if it is able to transmit one of the datagrams in the queue. The conditional statement on the call to sendo 142 ensures that the inter-packet gap following the previously transmitted datagram is maintained while allowing immediate transmission in the event that no datagrams have been transmitted within the IPG time interval that has just transpired.

The send( ) 142 member function dequeues one datagram from the queue and delivers it to the network medium 135. After delivering one datagram, the system timer is set by set system timer block 144 for the next IPG time interval. The system timer is set whether additional datagrams exist in the queue 134 or not. This, along with the conditional in the addDatagram( ) 132 member function, ensures the minimum IPG is preserved after the last available datagram 136 has been sent, and before any datagrams 130 that may arrive within the IPG time interval after the last datagram has been sent.

When the send( ) 142 function is called by invokeTimed( ) 146 after the last datagram has been delivered, but before any additional datagrams arrive, the system timer is not set, which allows for the immediate delivery of the next datagram 130 to arrive via the addDatagram( ) 132 function.

By encapsulating all of the system timer interfaces and datagram buffering data structures (i.e. queue 134) within the conceptual IPG Timer software object 140, a system needing the introduction of an IPG between network transmissions can do so transparently. The system using IPG timer object 140 makes function calls addDatagram( ) 132 as needed to deliver datagrams to the network and is unaware (and need not be aware) of the mechanism making it possible. In addition, any changes to the system timer interface, or storage data structure, can be made without the need for the calling system to be changed in any way.

Figure 4:
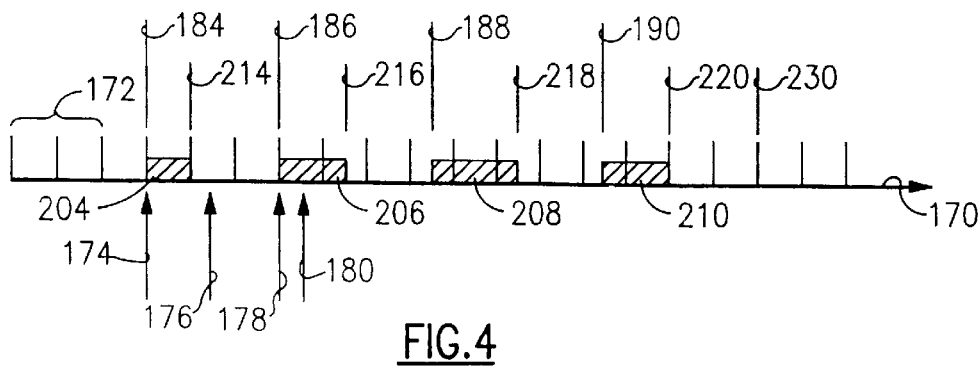
FIG. 4 is a schematic representation of the operation of a preferred embodiment of the interpacket gap timer of the invention.

Referring to FIG. 4, an example of the operation of the invention will next be described with respect to time line 170. Interval 172 represents the minimum IPG interval. Datagrams 204, 206, 208 and 210 are received by IPG timer object 140 at times 174, 176, 178 and 180, respectively.

First inbound datagram 130 arrives at time 174 via a call to addDatagram( ) 132, which results in a call to send( ) 142, which delivers the first outbound datagram 204 beginning at time 184. After delivering datagram 204, the system timer is set at the time 214. Second inbound datagram 130 arrives via addDatagram( ) 132 at time 176, which is during the time period (between times 214 and 186) that the system timer is set. Therefore, second inbound datagram 130 is enqueued for processing later. When the system timer expires (at time 186), second datagram 206 is delivered through the call to invokeTimed( ) 146, and the system timer is set at time 216 (to expire at time 188). Third and fourth inbound datagrams 130 arrive at times 178 and 180, respectively, which are during the processing of outbound datagram 206 and are consequently placed on queue 134. In similar manner, the next series of outbound datagrams 208 and 210, and IPG intervals (beginning at times 216, 218) expire, and the system timer is set after the transmission of fourth outbound datagram 210 at time 220. At time 230, the system timer expires, calling invokeTimed( ) 146 and therefore send( ) 142, which (because there are no datagrams present in queue 134) performs no processing, and subsequently does not reset the system timer.

ADVANTAGES OVER THE PRIOR ART

It is an advantage of the of this invention that an interpacket gap following the previously transmitted datagram is maintained while allowing immediate transmission of a next enqueued or received datagram in the event that no datagrams have been transmitted within the IPG time interval that has just transpired.

It is a further advantage of the invention that data packets are given to IPG timer 140 by processes within the system that wish to transmit data, without the need for the calling system to know through what mechanism the IPGs are being introduced, or even to know if IPGs are being introduced at all. Changes to the storage mechanism (i.e. queue 134) and/or changes in the system timer interface 143 are encapsulated and hidden from the calling environment which need not know what mechanism or what interface is used by IPG timer 132.

ALTERNATIVE EMBODIMENTS

It will be appreciated that, although specific embodiments of the invention have been described herein for purposes of illustration, various modifications may be made without departing from the spirit and scope of the invention. In particular, a slight variation in the pseudo code illustrated above yields an algorithm that allows concurrent execution within the member functions on systems that support multi-threading and parallel processing. Such a situation is illustrated as the arrival of third and fourth datagrams 178 and 180 in FIG. 4. Modifications to the pseudo code above would allow calls to be made to the addDatagram( ) function 132 concurrently with the execution of the send( ) member function 142 while it is processing second datagram 176/206.

Also, the invention may be embodied in computer-readable medium, such as magnetic or optical disc or tape, or equivalent, on which is stored a computer program of instructions for controlling a system to operate in accordance with the above described method. Similarly, the invention may be embodied in a computer-readable transmission medium, on which is communicated a computer program of instructions for structuring and operating a computer system in accordance with the system and method, respectively, of the invention.

Accordingly, the scope of protection of this invention is limited only by the following claims and their equivalents.

We claim:

1. Method for operating a digital computer, comprising the steps of:

responsive to receiving an inbound datagram, adding said inbound datagram to a FIFO queue and determining the status of an interpacket gap timer;

responsive to said interpacket gap timer status being OFF when said inbound datagram is received, dequeueing and transmitting an output datagram from said FIFO queue to a network medium and setting said gap timer status to ON; and responsive to said interpacket gap timer status changing from ON to OFF, dequeueing and transmitting an output datagram to said network medium and setting said gap timer status to ON.

2. Method for operating a digital computer, comprising the steps of:

responsive to receiving an inbound datagram:
determining the status of an interpacket gap timer and the status of a FIFO queue:
responsive to said FIFO queue not being empty, enqueueing said inbound datagram to said FIFO queue; and
responsive to said interpacket gap timer status being OFF when said inbound datagram is received, transmitting said inbound datagram as an outbound datagram to a network medium and setting said gap timer status to ON;

responsive to said interpacket gap timer status going from ON to OFF, dequeueing and transmitting an output datagram to said network medium and setting said gap timer status to ON.

3. Method for operating a digital computer to transmit a plurality of randomly received inbound datagrams as outbound datagrams separated by at least a minimum interpacket gap interval to a network medium, the method comprising the steps of:

responsive to invocation of a send ( ) function, transmitting an outbound datagram from a FIFO queue of datagrams to a network medium and setting a system timer for an interpacket gap interval;

responsive to receipt of an inbound datagram:
executing an addDatagram (d) function to add said inbound datagram to a FIFO queue;
determining if a system timer is set for a next interpacket gap interval, and
responsive to said system timer being elapsed, invoking said send( ) function; and responsive to said interpacket interval elapsing, invoking said send(f) function.

4. System for transmitting datagrams to a network separated by at least a minimum interpacket gap interval, comprising:

an interpacket gap timer object, said object including an invokeTimed( ) module, a send( ) module, and addDatagram( ) module, and a datagram queue;

said addDatagram( ) module being responsive to an inbound datagram for loading said inbound datagram to said datagram queue;

said send( ) module being responsive to being invoked for loading to a network an outbound datagram dequeued from said datagram queue, and for setting a system timer to time out said minimum interpacket gap interval; and said invokeTimed( ) module being responsive to said minimum interpacket gap interval lapsing for invoking said send( ) module.

5. The system of claim 4 wherein said addDatagram( ) module is further operable responsive to said minimum interpacket gap interval being lapsed when said inbound datagram is received for invoking said send( ) module.

* * * * *